Aug. 18, 1964     R. S. BLOUGH     3,144,853
AUTOMATIC HOG DRINKING CUP

Filed July 26, 1962     2 Sheets-Sheet 1

INVENTOR.
RONALD S. BLOUGH
BY
Wolfe, Hubbard, Voit & Osann
ATTORNEYS.

Aug. 18, 1964   R. S. BLOUGH   3,144,853
AUTOMATIC HOG DRINKING CUP
Filed July 26, 1962   2 Sheets-Sheet 2
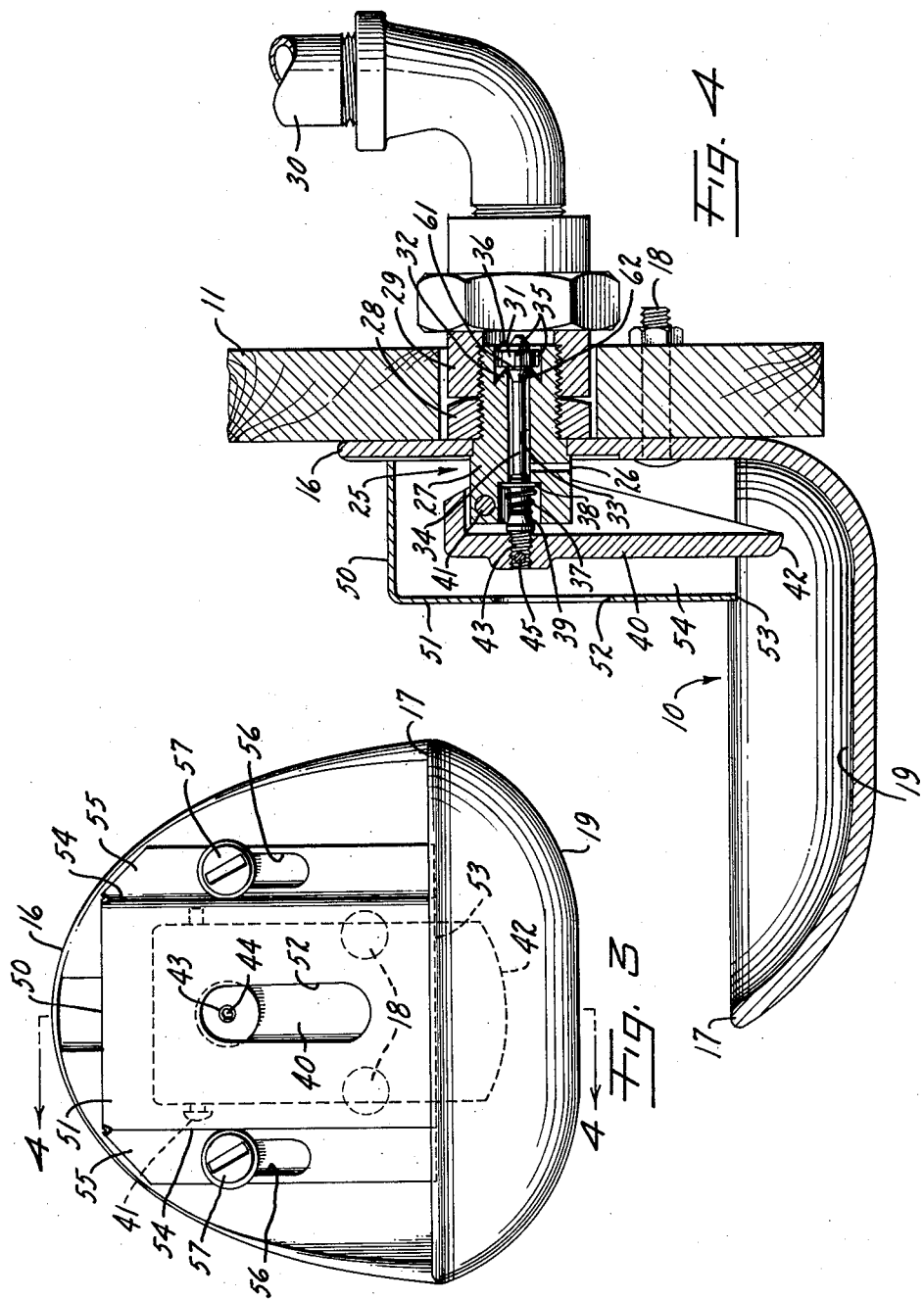
INVENTOR.
RONALD S. BLOUGH
BY
Wolfe, Hubbard, Voit & Osann
ATTORNEYS.

United States Patent Office 3,144,853
Patented Aug. 18, 1964

3,144,853
AUTOMATIC HOG DRINKING CUP
Ronald S. Blough, Fairfield, Iowa, assignor to Fairfield Engineering and Manufacturing Company, Fairfield, Iowa, a corporation of Iowa
Filed July 26, 1962, Ser. No. 212,544
2 Claims. (Cl. 119—75)

This invention relates to animal drinking and watering devices and more particularly concerns an automatic hog drinking cup.

During recent years livestock feeding and finishing programs have undergone further marked changes from the time when the animals were free to roam the fields and rummage for their own feed and water. In particular, it has been found to be advantageous to fatten and finish pigs and hogs in well lighted and well ventilated buildings which may be kept clean and sanitary. Swine are easily trained to draw their own water but are also intelligent enough to cause overflow in order to wallow or play in the water with resulting loss of sanitation. Contrary to customary belief, hogs have been found to be healthier and to have better appetites when kept clean and dry. It is, therefore, generally desirable to provide drinking facilities which supply ample water for the animals but which do not allow the water to be spilled or overflow on the floor.

In order to promote the growth and vigor of animals such as pigs and hogs it has also been found that certain vitamin and nutrient supplements may be advantageously added to the drinking water of the young animals. Curative additives and medicines for worms or other stomach parasites may also be conveniently added to the drinking liquid. In any case, however, it is desirable from the standpoint of economy and animal health to control the amount of water additives which the animals consume and to prevent the animals from drawing more water than they use. This can only be accomplished if the water which is supplied for the animals to drink is not spilled or wasted and if the animals are prevented from playing in their drinking water.

Accordingly, it is the primary aim of the present invention to provide an automatic drinking cup for watering pigs and hogs which discourages the animals from drawing more water than they will drink. It is a related object to provide such a drinking cup that is especially designated to permit the controlled addition of supplements to the animals' drinking water without danger that such expensive supplements will be spilled and wasted.

It is a further object of the invention to provide an automatic drinking cup as described above which discourages the animals from playing in their drinking water. Moreover, it is an object to provide such a drinking cup which may be easily adjusted to accommodate pigs and hogs of all ages and yet which is effective to prevent water wastage.

It is also an object to provide a drinking cup as characterized above that can be easily adjusted to fit all typical water supply pressures, and which is also simple and economical to manufacture and convenient and easy to install. Other objects and advantages of the invention will become apparent upon reading the following detailed description and upon reference to the drawings in which:

FIG. 3 is an end elevation of the cup shown in FIG. 1; and

FIG. 4 is a longitudinal section taken approximately along the line 4—4 in FIG. 3.

While the invention will be described in connection with a preferred embodiment, it will be understood that I do not intend to limit the invention to that embodiment. On the contrary I intend to cover all alternatives, modifications and equivalents as may be included within the spirit and scope of the invention as defined by the appended claims.

Figure 1:
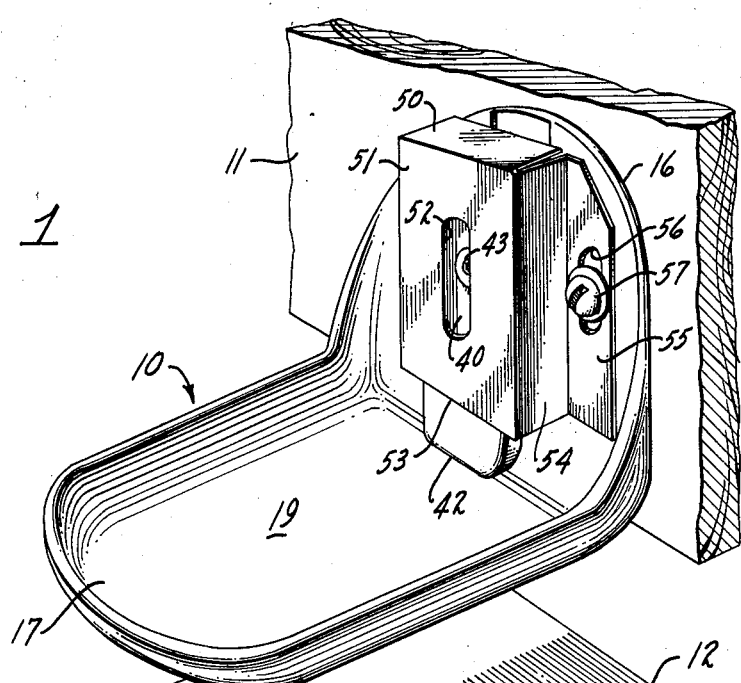
FIGURE 1 is a perspective of a drinking cup constructed in accordance with the present invention and mounted in an animal pen.

Turning now to the drawings, there is shown in FIGURE 1 a drinking cup 10 constructed in accordance with the invention mounted on a wall 11 defining one end of an animal pen having a floor 12. The illustrated cup 10 is particularly intended for pigs and hogs and hence is positioned just above the level of the floor 12 so as to be readily accessible to young pigs as well as mature hogs. The cup 10 preferably has a unitary body including a raised back panel 16 and a bowl 17. To rigidly mount the cup 10 in the desired position, the back panel 16 is secured as by bolts 18 to the wall 11 (FIG. 4). Since even a mature hog can easily reach down to the floor 12 with its nose, as in rooting, there is no necessity to raise the level of the drinking cup 10 as the pigs grow to maturity.

Figure 2:
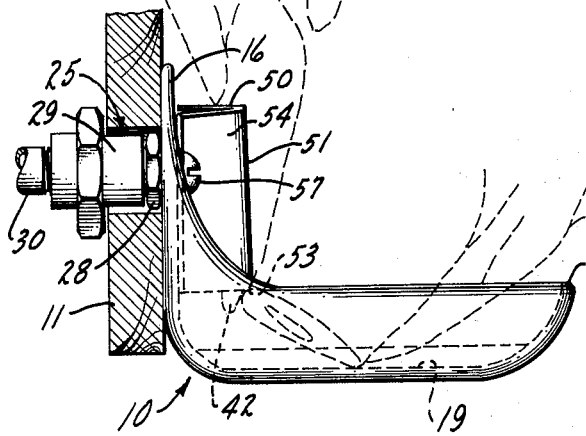
FIG. 2 is a side elevation of the cup shown in FIG. 1 with a hog indicated by dashed lines drinking from the cup.
Figure 2:
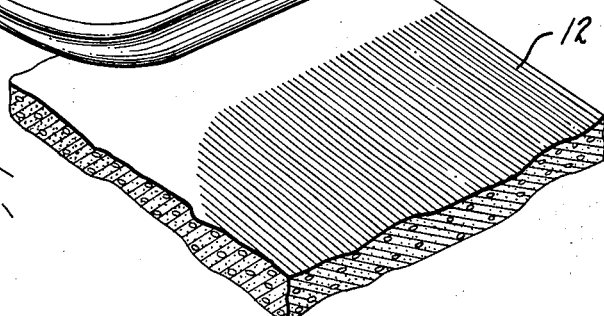

In order for pigs and hogs to easily drink from the cup 10, the bowl 17 is formed with a shallow rounded bottom 19 which is slightly elongated in a direction perpendicular to the wall 11 so that it conforms to the general outline of a hog's lower jaw. This construction encourages a hog to literally "drink the cup dry" which helps to keep the bottom 19 of the cup clean. In addition, since the bowl 17 is quite shallow dirt has little opportunity to collect on the sides of the bowl. The manner in which animals drink from the cup 10 will be understood however, for purposes of illustration a partial figure of a hog drinking from the cup is illustrated by the dashed lines in FIG. 2. It will also be appreciated that the preferred elongated shape of the shallow bowl 17 permits animals of all sizes to drink from the cup but discourages them from drinking sideways.

To admit water into the cup 10 a valve 25 having a nozzle opening 26 is mounted on the back panel 16 above the overflow level of the bowl 17 with the nozzle opening aimed down into the bowl. As shown in FIG. 4, the valve 25 includes a valve body 27 anchored to the back panel 16 by a large nut 28 and a coupling 29 joins the valve body and a water line 30 which is connected to a source of water under pressure. The valve 25 is closed by the engagement of a resilient sealing member 31 on an annular seat 32 that surrounds an inlet opening 33 through which water is passed from the conduit 30 to the valve nozzle 26. The sealing member 31 is carried by a valve stem 34 which is shiftable within the inlet opening 33. To prevent lateral vibration of the sealing member 31 as water is admitted to the inlet opening, the sealing member is provided with a plurality of radially extending tabs 35 closely confined within an opening 36 which surrounds the annular seat 32. Thus, the incoming water passes between the radial tabs 35 and through the opening 36 into the opening 33 and is discharged through the nozzle 26 into the bowl 17.

For holding the valve 25 normally closed, a compressed spring 37 is mounted on the valve stem 34 between a shoulder 38 formed on the valve body 26 and a collar 39 formed on the valve stem. In the preferred embodiment, the spring 37 is formed in a conical configuration so that, when compressed, adjacent turns may be pressed within one another thereby saving space. The valve stem 34 is urged to the left, as seen in FIG. 4, so as to hold the sealing member 31 against the valve seat 32 and thus block the end of the opening 33 from the water line 30.

In order that an animal may draw water into the cup 10, a pressure sensitive control linkage is provided suitably taking the form of a lever or paddle 40 pivotally mounted on the cup with its upper end portion coupled to the valve stem 34 to operate the valve and its lower end exposed for activation by the snout of a pig or hog. In the illustrated embodiment, the paddle is pivoted on a pin 41 which passes through the valve body 27 so that the paddle 40 is free to swing about a horizontal axis toward and away from the valve stem 34. The paddle 40 is preferably formed with a tip portion 42 disposed within the bowl 17 of the cup 10 so that the paddle may be shifted by the nose of an animal while it is drinking (see FIGS. 2, 3 and 4).

For coupling the paddle to the valve 25, an operator in the form of a screw 43 is threaded into the paddle 40 so as to abut the end of the valve stem 34. The exposed end of the operator screw 43 is formed with a hexagonal recess 44 so that by inserting the end of an allen wrench the screw can be rotated and adjustably positioned in the paddle. To hold the screw 43 in an adjusted position, a nylon lock 45 is inserted transversely within the screw so that it projects against the threaded portion of the paddle. When installed, the operator screw 43 is positioned so that movement of the paddle 40 toward the valve stem 34 in a counter clockwise direction as seen in FIG. 4, opens the valve 25 to allow a stream of water to pass from the nozzle 26 into the bowl 17. Conversely, movement of the paddle in a clockwise direction closes the valve 25.

In further accord with the present invention, the cup 10 is provided with a guard 50 which prevents the animals from drawing excessive water into the cup which will overflow the bowl 17 and spill onto the floor 12. In the illustrative embodiment, the guard 50 is in the form of a box-like shield having a face 51 which overlies the upper portion of the paddle 40. A slot 52 is cut in the face 51 to permit insertion of an allen wrench to adjust the screw 42.

The guard 50 extends downwardly toward the bottom of the bowl 17 and terminates in a lower edge 53 located so that only the tip 42 of the paddle is accessible to the nose of an animal drinking from the cup. Preferably the lower edge 53 of the guard is disposed substantially in the plane defined by the top edge of the bowl 17. Thus, it will be appreciated that in order for an animal to draw water into the cup, it must push its nose beneath the bottom edge of the guard 50 and against the top 42 of the paddle 40. However, due to the position of the guard 50, the water flowing into the cup will cover the nostrils of the animal before it overflows the bowl 17. (See FIG. 2.) It has been found that pigs and hogs can be easily trained to drink from cups constructed in this manner and an animal will pull its nose away from the paddle 40 so it can breathe with comfort and thus will automatically shut off the water supply. The incoming water is also directed behind the guard 50 so as not to splash out as it descends into the bowl 17.

To allow pigs and hogs of all ages to use the cup 10 without wasting water, the guard 50 is mounted for vertical adjustment. Connected to the face 51 of the guard a pair of legs 54 straddle the paddle 40 and carry flanges 55 which abut the back panel 16. A slot 56 is formed in each of the flanges 55 to receive a screw 57 which is threaded into a tapped hole in the back panel 16. To adjust the guard 50, the two screws 57 are loosened and the guard is moved to the proper height to define a nose space for the animal which the cup is to serve. It will, of course, be understood that pigs and hogs of different ages, and indeed of different breds, have noses of varying sizes and shapes. However, the vertical adjustment of the guard 50 permits the cup 10 to be used for pigs and hogs of all ages and breeds without danger of the water being spilled or wasted and it also discourages the animals from playing in their water.

Following the preferred procedure, after the guard 50 has been adjusted to accommodate animals of a particular size, the screw 43 is adjusted to regulate the rate that water flows into the cup when the valve 25 is opened. By suitably adjusting the flow rate, animals are encouraged to drink nearly all of the water as it flows into the bowl 17. In addition, the flow rate can be adjusted so that an animal can not draw water into the cup so fast that it will overflow the bowl before the animal must pull its nose away from the paddle 40 to breathe.

A further advantage stemming from the present invention is that the cup 10 with its guard 50 may be advantageously employed for supplying pigs and hogs with drinking water to which a nutrient or curative supplement has been added. Since the cup 10 is designed to prevent water wastage, the expensive supplements may be conserved. In addition, since the amount of water which the indivadual animals consume may be accurately estimated, it is also possible to determine the amount of water supplements that are consumed.

In order that the cup 10 may be used with any water system without danger of "water hammer," the valve stem 34 is provided with a cylindrical portion 61 which fits loosely within the inlet opening 33 of the valve. The shoulder portion 61 tapers down at 62 to the diameter of the valve stem so that the valve 25 is not fully open until the sealing member 31 is lifted from the valve seat 32 and the cylindrical portion 61 is slid from the inlet opening 33. The loose fit of the cylindrical portion 61 within the end of the opening 33 permits a limited flow of water into the valve 25 as soon as the sealing member 31 is unseated. However, the limited flow avoids the water from entering at a very high velocity which could cause hammering vibration of the member 31 against the seat 32. This feature is of importance in that the avoidance of water hammer in the system prevents drinking animals from being startled or annoyed when using the cup 10.

It will also be apparent, to those skilled in this art, that the cup 10 may be easily and economically manufactured since the bowl 17 and back panel 16 may be cast in a unitary construction. Moreover, the cup can be quickly and conveniently mounted in an animal pen, and the guard 50 and the operator screw 43 may be adjusted to suit the particular circumstances.

I claim as my invention:

1. An automatic hog drinking cup comprising, in combination, a body having a generally vertical back panel adapted to be secured within an animal pen, said body including a bowl portion integral with said back panel and defining a slightly elongated shallow bowl with a rounded bottom extending substantially at a right angle from said back panel, a valve mounted on said back panel for admitting water into said bowl, a generally flat, movable paddle mounted on said back panel and generally parallel thereto for operating said valve, a guard having a generally box-like shape overlying the upper portion of said paddle and having a lower edge position substantially in the plane defined by the top edge of said bowl, said paddle having a tip portion disposed within said bowl below the lower edge of said guard and the plane defined by the top edge of the bowl and engagebale only by the nose of an animal to draw water into said bowl, the lower edge of the guard and the nose of the animal being covered with water causing the animal to retreat from said tip and shut off the water before it overflows said bowl.

2. A combination as defined in claim 1, wherein said guard is carried on said back panel and is vertically adjustable relative to the tip of said paddle.

References Cited in the file of this patent
UNITED STATES PATENTS

| 1,743,719 | Louden et al. | Jan. 14, 1930 |
| 2,845,046 | Hart | July 29, 1958 |
| 3,043,267 | Blough | July 10, 1962 |